(12) United States Patent
Huang et al.

(10) Patent No.: US 11,125,642 B2
(45) Date of Patent: Sep. 21, 2021

(54) MULTI-SCALE REAL-TIME ACOUSTIC EMISSION MONITORING AND ANALYSIS METHOD FOR MECHANICAL SEAL

(71) Applicant: TSINGHUA UNIVERSITY, Beijing (CN)

(72) Inventors: Weifeng Huang, Beijing (CN); Xiangfeng Liu, Beijing (CN); Yuan Yin, Beijing (CN); Ying Liu, Beijing (CN); Decai Li, Beijing (CN); Yongjian Li, Beijing (CN); Shuangfu Suo, Beijing (CN); Zixi Wang, Beijing (CN); Xiaohong Jia, Beijing (CN); Fei Guo, Beijing (CN)

( * ) Notice: Subject to any disclaimer, the term of this patent is extended or adjusted under 35 U.S.C. 154(b) by 0 days.

(21) Appl. No.: 17/044,244

(22) PCT Filed: Nov. 23, 2018

(86) PCT No.: PCT/CN2018/117060
§ 371 (c)(1),
(2) Date: Sep. 30, 2020

(87) PCT Pub. No.: WO2020/006971
PCT Pub. Date: Jan. 9, 2020

(65) Prior Publication Data
US 2021/0208021 A1    Jul. 8, 2021

(30) Foreign Application Priority Data
Jul. 3, 2018    (CN) .......................... 201810715922.9

(51) Int. Cl.
*G01M 3/24* (2006.01)
*F16J 15/34* (2006.01)

(52) U.S. Cl.
CPC ........... *G01M 3/24* (2013.01); *F16J 15/3492* (2013.01)

(58) Field of Classification Search
CPC .......... F16J 15/3492; G01M 3/24–246; G01N 29/14
See application file for complete search history.

(56) References Cited

U.S. PATENT DOCUMENTS 4,748,850 A * 6/1988 Kataoka ................. G01H 1/003
73/660
5,041,989 A * 8/1991 Kataoka ................. G01N 29/40
702/39

(Continued)

FOREIGN PATENT DOCUMENTS

| CN | 101435799 A * | 5/2009 |
| CN | 206845897 U | 1/2018 |

(Continued)

OTHER PUBLICATIONS

Miettinen et al, Case Study Acoustic emission in monitoring sliding contact behaviour, Elsevier Science S.A. Wear 181-183 (1995) 897-900 (Year: 1995).*

(Continued)

*Primary Examiner* — David L Singer
(74) *Attorney, Agent, or Firm* — Novoclaims Patent Services LLC; Mei Lin Wong

(57) ABSTRACT

A real-time monitoring and analysis method for a mechanical seal. In the method, an acoustic emission signal generated by a friction pair at a mechanical seal end surface is measured; a specific acoustic source generate signals on a plurality of specific frequency bands on an acoustic scale. In a seal operating process motion causes the acoustic emission signal to change on a dynamic time scale equivalent to a period of rotation. In a long-term seal service process, cumulative performance changes occur on a service time scale due to running-in, wear, and/or aging of elastic elements; for this feature, the long-term change process of the acoustic emission signal needs to be considered. Analysis is (Continued)

performed, on multiple scales, in combination with auxiliary information and with determined physical characterization quantities passed to scales of longer time, thereby determining the real-time working state of the seal and providing a performance change expectation of the seal. In an embodiment, the acoustic scale transfers frictional power consumption, maximum contact depth and leakage rate to the dynamic scale, and the dynamic scale transfers a wear rate to the service scale, while part of the auxiliary information of the acoustic scale analysis may come from the results of the service scale analysis.

9 Claims, 5 Drawing Sheets

(56) References Cited

U.S. PATENT DOCUMENTS

| | | | | |
|---|---|---|---|---|
| 6,122,966 | A * | 9/2000 | Goodman | F16C 33/6625 184/105.2 |
| 6,360,610 | B1 * | 3/2002 | Jarzynski | G01N 29/11 73/32 A |
| 2010/0106429 | A1 * | 4/2010 | Horak | F16J 15/3492 702/34 |
| 2014/0182381 | A1 * | 7/2014 | Comeaux | G01N 29/12 73/587 |
| 2016/0069775 | A1 * | 3/2016 | Thomson | G01M 13/045 702/179 |

FOREIGN PATENT DOCUMENTS

| | | |
|---|---|---|
| EP | 0998671 B1 | 10/2000 |
| GB | 2430034 A * | 3/2007 ........... F16J 15/3492 |

OTHER PUBLICATIONS

Towsyfyan et al, Modelling acoustic emissions generated by tribological behaviour of mechanical seals for condition monitoring and fault detection, Tribology International 125 (2018) 46-58 (Year: 2018).*
Sikorska et al, Challenges and obstacles in the application of acoustic emission to process machinery, Proc. IMechE vol. 222 Part E: J. Process Mechanical Engineering (Year: 2008).*
Towsyfyan et al, Identification of lubrication Regimes in Mechanical Seals using Acoustic Emission for Condition Monitoring, University of Huddersfield Repository, The 54th Annual Conference ofThe British Institute of NonDestructive Testing BINDT 2015, Sep. 8-10, 2015, Telford, UK. (Year: 2015).*
Huang et al, Face Rub-Impact Monitoring of a Dry Gas Seal Using Acoustic Emission, Tribol Lett (2013) 52:253-259 (Year: 2013).*
Li et al, The Contact State Monitoring for Seal End Faces Based on Acoustic Emission Detection, Hindawi Publishing Corporation Shock and Vibration vol. 2016, Article ID 8726781, 8 pages (Year: 2016).*
Yin et al, Analysis of the Dynamic Friction of a Gas Face Seal Based on Acoustic Emissions, Tribology Letters (2018) 66:85 (Year: 2018).*
Machine Translation CN101435799B (Year: 2021).*

* cited by examiner

MULTI-SCALE REAL-TIME ACOUSTIC EMISSION MONITORING AND ANALYSIS METHOD FOR MECHANICAL SEAL

FIELD OF INVENTION

The present invention relates to the field of fluid sealing and the technical field of acoustic emission monitoring, and more particularly to a multi-scale and real-time monitoring and analysis method for mechanical seal.

DESCRIPTION OF RELATED ARTS

Mechanical seal is a common form of shaft end seal in rotating mechanical equipment. The paired rotating ring and non-rotating ring rotate relatively to form a sealed tribo-pair, which greatly reduces leakage while avoiding or even eliminating contact. The mechanical seal has a compact structure, which makes it difficult for users to grasp the information about the working status of the seal, which means that when the seal performance is poor or even fails, the cause cannot be accurately judged, and the failure risk of the seal cannot be well predicted to take countermeasures. At the same time, some people have proposed to use active control to adjust the working state of the seal in real time, and such a technology must also be implemented based on an accurate grasp of the working state of the seal. In response to the above-mentioned mechanical seal maintenance and development needs, real-time monitoring of the mechanical seal is particularly necessary.

At present, the existing mechanical seal monitoring technologies mainly include end temperature monitoring, eddy current monitoring, reflection ultrasonic monitoring and acoustic emission monitoring. Wherein the acoustic emission monitoring is not only convenient for engineering applications, but also carries a wealth of information about the status of the sealing tribo-pair, so it has great application potential. However, it is very difficult to interpret the large amount of information in the acoustic emission signals. A number of cutting-edge scientific studies have explained the correspondence between the characteristics of acoustic emission signals in specific aspects and the working state of mechanical seals from different angles, but no systematic method for comprehensive analysis of acoustic emission signals has been formed.

SUMMARY OF THE PRESENT INVENTION

In order to overcome the aforementioned problems of the existing arts, the present invention provides a multi-scale and real-time monitoring and analysis method for a mechanical seal, which measures the acoustic emission signals generated by the tribo-pair of the end face of the mechanical seal, processing analysis at multiple scales in combination with other auxiliary information according to the different physical connotations of the characteristics of the acoustic emission signals at different scales, so as to judge the real-time working state of the seal and give the performance expectation of the seal.

In order to accomplish the above objective, the technical solution of the present invention is:

A multi-scale and real-time monitoring and analysis method for a mechanical seal, which measures the acoustic emission signals generated by the tribo-pair of the end face of the mechanical seal, processing analysis at multiple scales in combination with other auxiliary information according to the different physical connotations of the characteristics of the acoustic emission signals at different scales, so as to judge the real-time working state of the seal and give the performance expectation of the seal.

The multi-scale implementation method is: Process analysis on a certain time scale (called the Nth-level time scale) can obtain a specific result. In addition to its physical significance, this specific result also serves as the object of analysis for the time scale of the next higher level (that is, the (N+1) level)—analyzing the change of the N-level result with time on the (N+1)-level time scale will give another result of another aspect. And similarly, this result not only has physical meaning in itself, but also can be used as the analysis object of the (N+2)th time scale, and so on. At the same time, under certain conditions, the results under a longer time scale can also be fed back to a shorter time scale.

The method for measuring the acoustic emission signals generated by the tribo-pair of the end face of the mechanical seal is: through generating the stress wave from the the material which releases internal energy, the acoustic emission signals is generated on the end face of the mechanical seal.

The scales are acoustic scale, dynamic scale and service scale, wherein a specific sound source will generate signals in a certain number of frequency bands, and the scale for collecting and identifying these signals is called the acoustic scale; the movement of the seal during the operation due to the dynamics causes the acoustic emission signals to change accordingly, this feature is reflected on a time scale equivalent to the rotation period and this scale is called the dynamic scale; during the long-term service of the seal, the performance changes cumulatively due to factors including running-in, wear, and aging of the elastic element, this feature requires an investigation of the long-term change history of the acoustic emission signals and this scale is called the service scale.

The particular step/method of determining the real-time working state of the seal and giving the performance expectation of the seal by processing analysis at multiple scales in combination with other auxiliary information is:

The acoustic scale: The analysis of the acoustic scale is obtained from a short period of acoustic emission waveform combined with auxiliary information (which can be the inherent information of the device, the output of the other two scales or the measurement result of non-acoustic emission), so that a series of characteristic quantities corresponding to various states of the tribo-pair is obtained. A typical method is to preprocess by filtering the frequency spectrum and introducing auxiliary information modification, and then transform the frequency spectrum into a series of physical representations via a preset mapping function established according to the correspondence between the frequency band and the physical process. These characterizations on the one hand have the function of showing the sealing working state to the user, on the other hand they are also the basis of dynamic scale analysis.

The dynamic scale: When the seal rotating ring rotates with the shaft, it generates periodic excitation to the seal system, resulting in a periodic dynamic response of the seal system. The specific form of this periodic response is closely related to the severity of friction and circumferential non-uniformity (such as deflection, waviness, etc.) of the sealing system. The typical situation of the relationship between the dynamic change mode of the acoustic characterization quantity and the sealing state can be obtained in advance through experimental testing or computer simulation, which can in turn be further inferred on the basis of the acoustic scale analysis of the measured equipment.

The service scale: During the operation of the seal, the seal ring will inevitably wear (even the normally working non-contact seal will wear during the start and stop process), springs and secondary seals may also degrade performance during long-term use. Since it is already possible to judge the severity of friction through analysis of the dynamic scale, the wear rate is obtained on this basis, and then the relationship between the cumulative wear rate and the progress of seal deterioration established in advance can be used to predict future performance changes and failures risk. At the same time, the degradation progress itself can also be used as a reference for the analysis of acoustic scale and dynamic scale.

The advantageous effect of the present invention:

The present invention measures the acoustic emission signals generated by the tribo-pair of the end face of the mechanical seal, and processes analysis at multiple scales in combination with other auxiliary information according to different physical connotations of the characteristics of acoustic emission signals at different scales, thereby determining the real-time working state of the seal and providing the performance expectation of the seal.

DETAILED DESCRIPTION OF THE PREFERRED EMBODIMENT

The present invention will be further described in detail in conjunction with the drawings.

Embodiment 1

Figure 1:
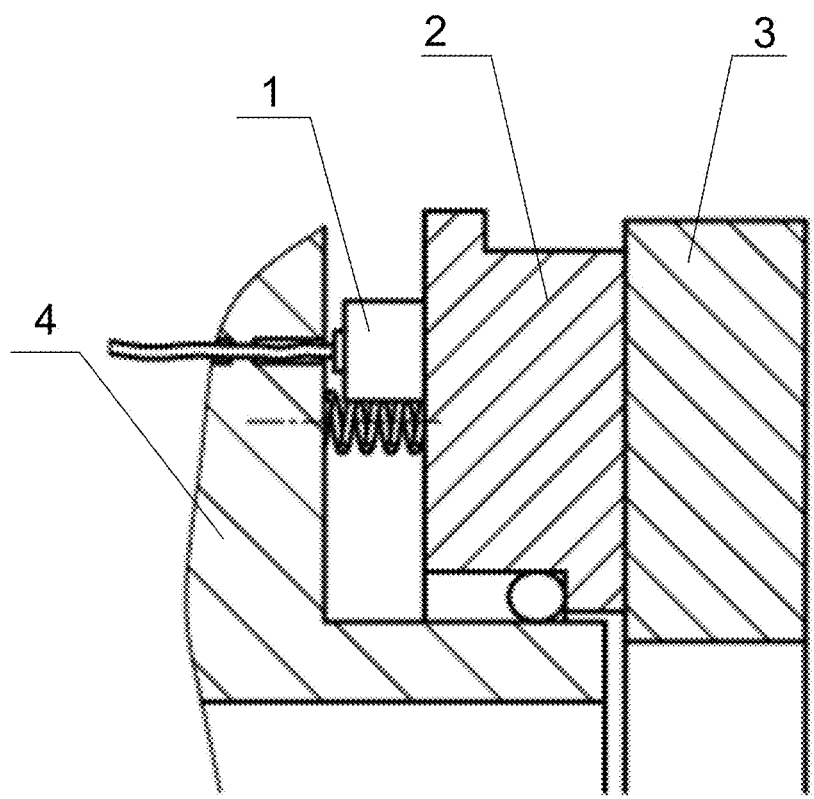
FIG. 1 is a schematic diagram of the installation of acoustic emission sensors.

Referring to FIG. 1, the mechanical seal has a non-rotating ring 2 floatingly supported on a non-rotating ring seat 4 and paired with a rotating ring 3 which is fixedly connected to a shaft and rotates accordingly. A miniature acoustic emission sensor 1 is connected to the rear side of the non-rotating ring 2 so that the acoustic emission signals generated by the sealing tribo-pair is converted into an electrical signals in real time, amplified by an amplifier, and then collected by an acquisition system (which includes an acquisition card, an acquisition software and a computer they rely on) at a sampling rate of $f_s$=2 MHz to acquire a signal $U^{(0)}$, which is called an original signal.

Figure 2:
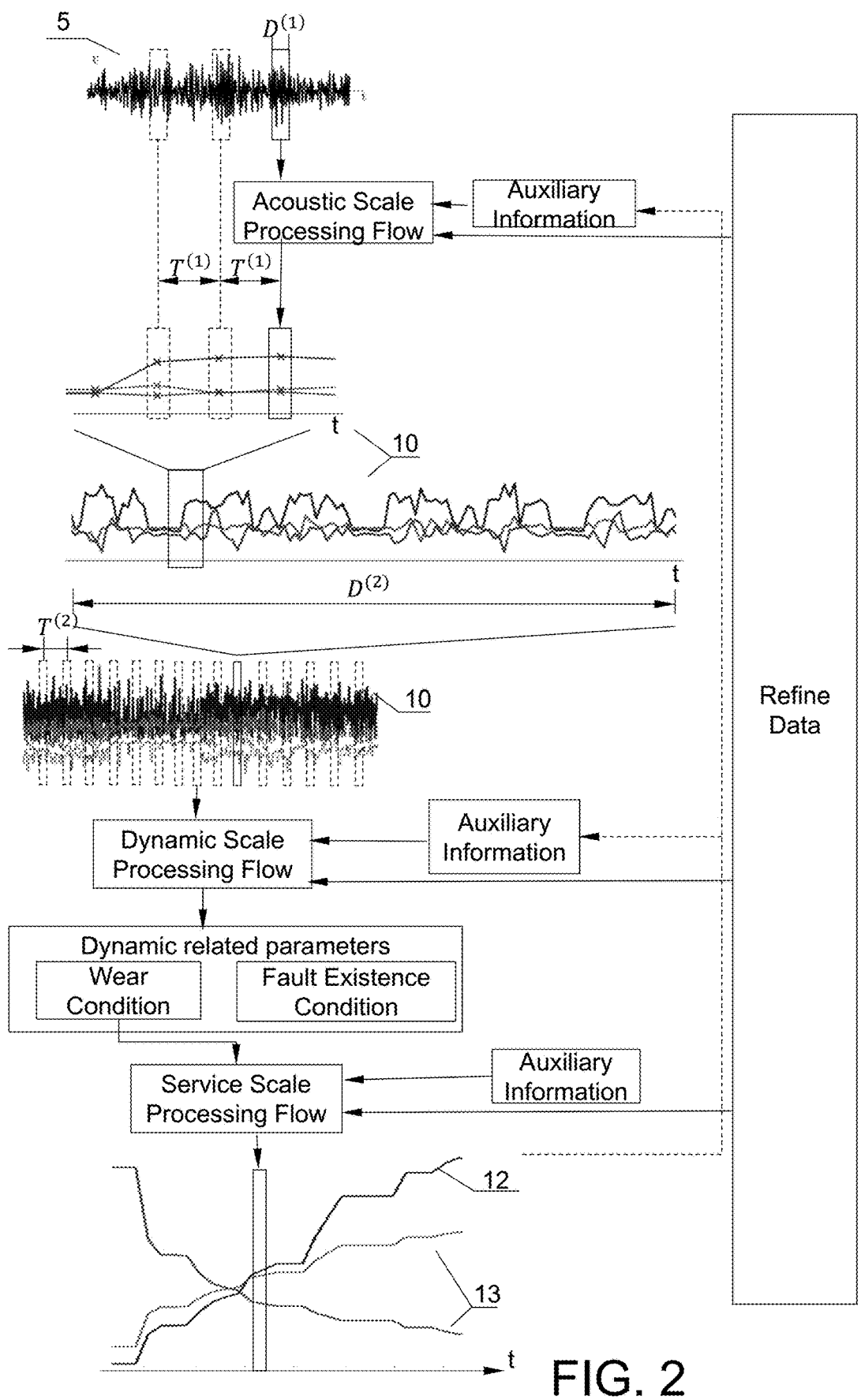
FIG. 2 is a schematic diagram of the process of the present invention.

Referring to FIG. 2, in general, the analysis method in this embodiment starts from the original acoustic emission signal 5, and is mainly based on it and supplemented by an auxiliary information and an algorithm calibrated by experimental data. Through processing on three different time scales: acoustic scale, dynamic scale and service scale, a series of information about the working state of the seal is obtained. In particular, a targeted analysis method is used at various time scales to derive physical characterization quantities and pass them to scales of longer time (In this embodiment, the acoustic scale transfers frictional power consumption, maximum contact depth and leakage rate to the dynamic scale, and the dynamic scale transfers a wear rate to the service scale.) while each scale can get meaningful results for analyzing the working status of the seal. At the same time, part of the auxiliary information of the acoustic scale analysis in this example also comes from the results of the service scale analysis.

Figure 3:
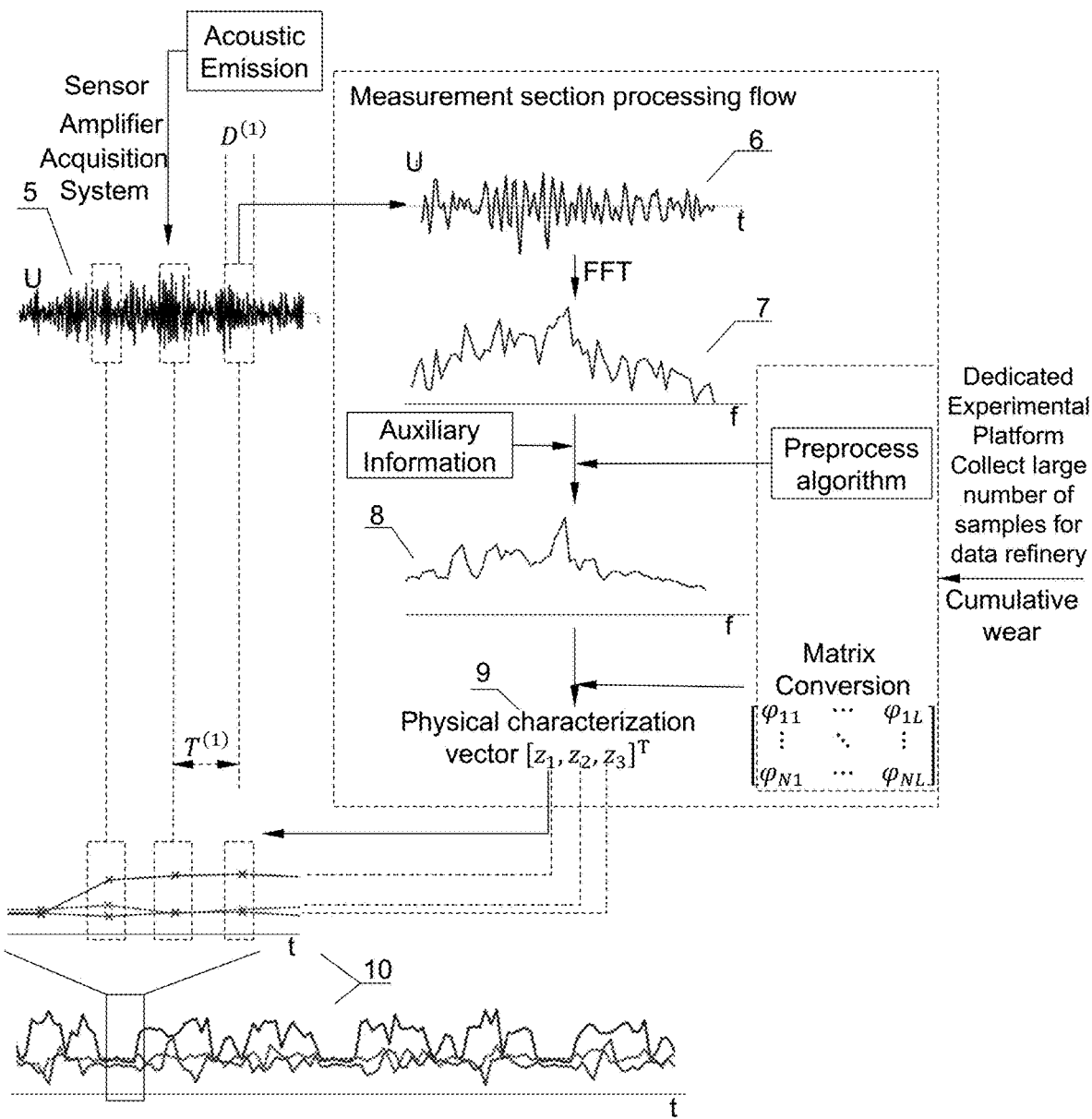
FIG. 3 is a schematic diagram of the acoustic scale.

The Acoustic Scale:

Referring to FIG. 3, take a number of M=256 consecutive sample points in the original signal 5, and divide into one acoustic scale analysis segment 6, then a length of time corresponding to each acoustic scale analysis segment is $D^{(1)}$=128μo. For each acoustic scale analysis segment, perform the following process:

(1) process fast Fourier transform and calculate power spectrum 7. Express the power at each frequency as the initial feature vector in M/2=128 dimensions.

(2) perform preprocessing of the initial feature vector by using pre-processing algorithm to obtain a feature vector 8 after the pre-processing. The pre-processing mainly includes three purposes: ① noise reduction, ② smoothing the power spectrum (to avoid the difference results caused by very small frequency differences that have no actual physical significance), ③ modification according to the speed and accumulated wear, ④ perform the necessary nonlinear mapping for subsequent linear analysis.

(3) Use the conversion matrix to convert the pre-processed initial feature vector 8 into a set of meaningful physical characterization vector 9: friction power consumption, maximum contact depth and leakage rate, and assemble them into a 3-dimensional vector $U^{(1)}$.

In this way, a three-dimensional acoustic scale physical representation vector 9 is derived from each acoustic scale analysis segment 6.

Take the acoustic scale analysis segment in the original signal uniformly, so that the time interval of the midpoint of every two adjacent acoustic scale analysis segments is $T^{(1)}$=512 μs (In this embodiment, $T^{(1)}>D^{(1)}$, so there are discarded data in the two adjacent acoustic scale analysis segments, this method can reduce the amount of calculation. $T^{(1)}>D^{(1)}$ is not an inevitable choice, when the computing resources are sufficient, $T^{(1)}=D^{(1)}$ or even $T^{(1)}<D^{(1)}$ can be used to improve the analysis accuracy). In this way, the physical characterization vector 9 obtained from the analysis sections of each acoustic scale forms a sequence 10 in which the time interval between adjacent items is $T^{(1)}$=512 μs.

Figure 4:
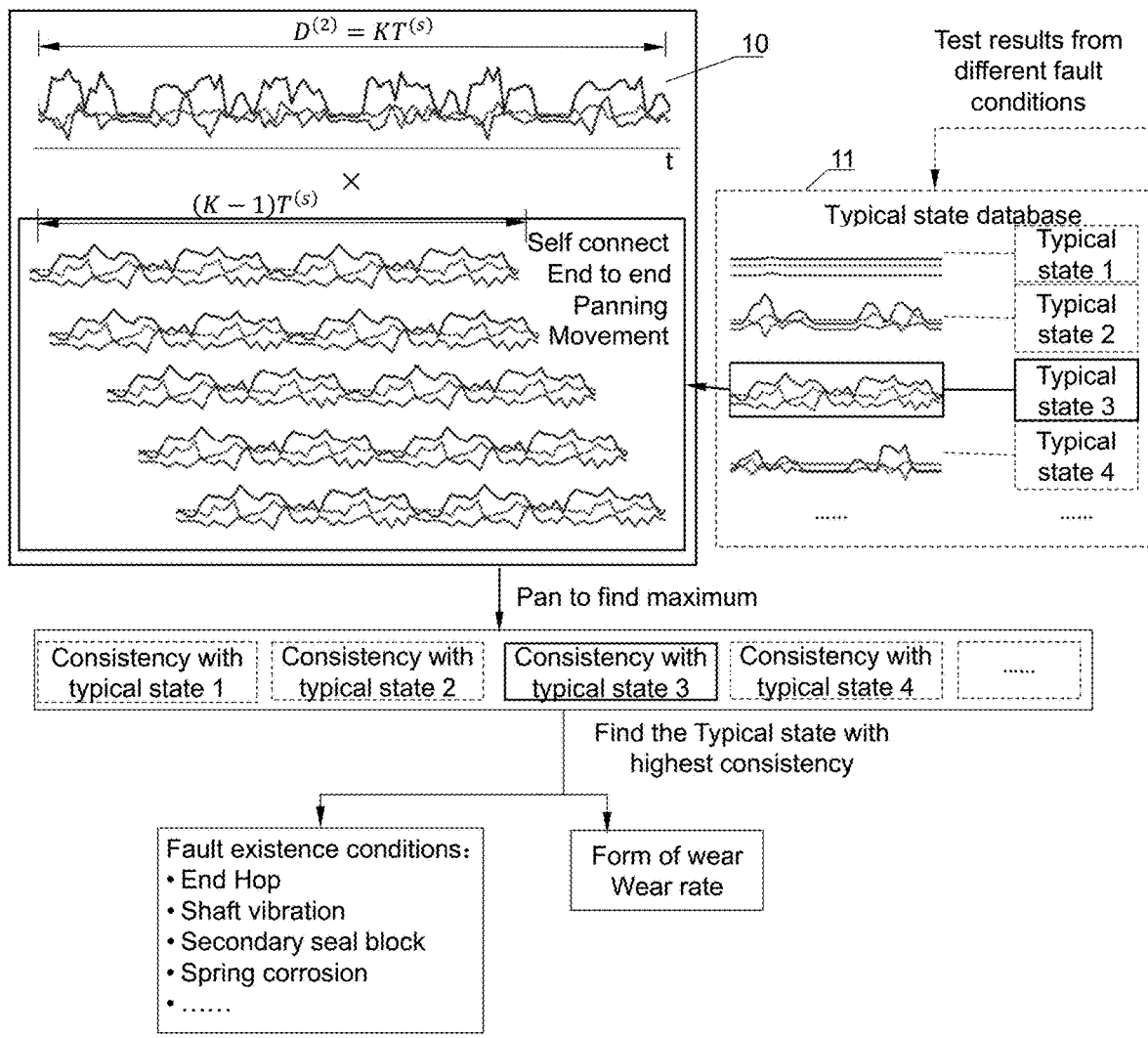
FIG. 4 is a schematic diagram of the dynamic scale.

The Dynamic Scale:

Referring to FIG. 4, the analysis of the dynamic scale is performed on the aforementioned acoustic scale characterization vector sequence, which is as shown in FIG. 2:

(1) Select a period of time $D^{(2)}$ satisfying $$\frac{D^{(2)}}{T^{(1)}}$$

as an integer, and $D^{(2)} \geq KT^{(s)}$ and $D^{(2)}$ is as small as possible. Where $T^{(s)}$ is the rotation period; K is an integer and K>2, preferably (2~10), in this embodiment, take K=3. For example, if the rotation speed is 6000 rpm, the rotation period is $T^{(s)}$=10 ms, then take the length of $D^{(2)}$=59 $T^{(1)}$=30.208 ms. Extract the acoustic scale characterization vector sequence (referred to as the measured sequence) of this period, and record it as $U^{(1)}(i)$, i=0, 1, . . . , 58;

(2) Take a typical state database 11 of corresponding seal type, pressure and speed, which is used for comparison calculation. The typical state database includes dozens of typical states, and each typical state records the change sequence (recorded as $U_j^{(1)}(i)$, i=0, 1, . . . , 19, j is the typical state number and is referred to as the typical sequence) of its acoustic scale characterization vector in a cycle with the same $T^{(1)}$. At the same time, it records the wear status (wear form and wear rate) and the existence of the fault source (whether there is a fault, and if there is a fault, what is the cause of the fault);

(3) Calculate the degree of agreement between the measured physical characterization sequence of the selected period and each typical state. Connect the physical characterization sequence $U_j^{(1)}(i)$, i=0, 1, . . . , 19 of the typical state from end to end for K−1=2 times to obtain $\tilde{U}_j^{(1)}(i)$, i=0, 1, . . . , 39, calculate the consistency by the following formula:

$$C_j = \max_{\Delta i = 0, 1, \ldots, 19} \sum_{i=0}^{39} \tilde{U}_j^{(1)}(i) U^{(1)}(i + \Delta i)$$

Identify the typical state with the highest degree of agreement and judge its wear condition and the existence of the fault source as the most likely state of the seal at this time. When there are multiple typical states with high degree of agreement and little difference, then they are considered to be more likely. Approximate the cumulative wear is the main factor that determines the deterioration process of the sealing end face, record the wear rate as $U^{(2)}$ for service scale analysis.

Figure 5:
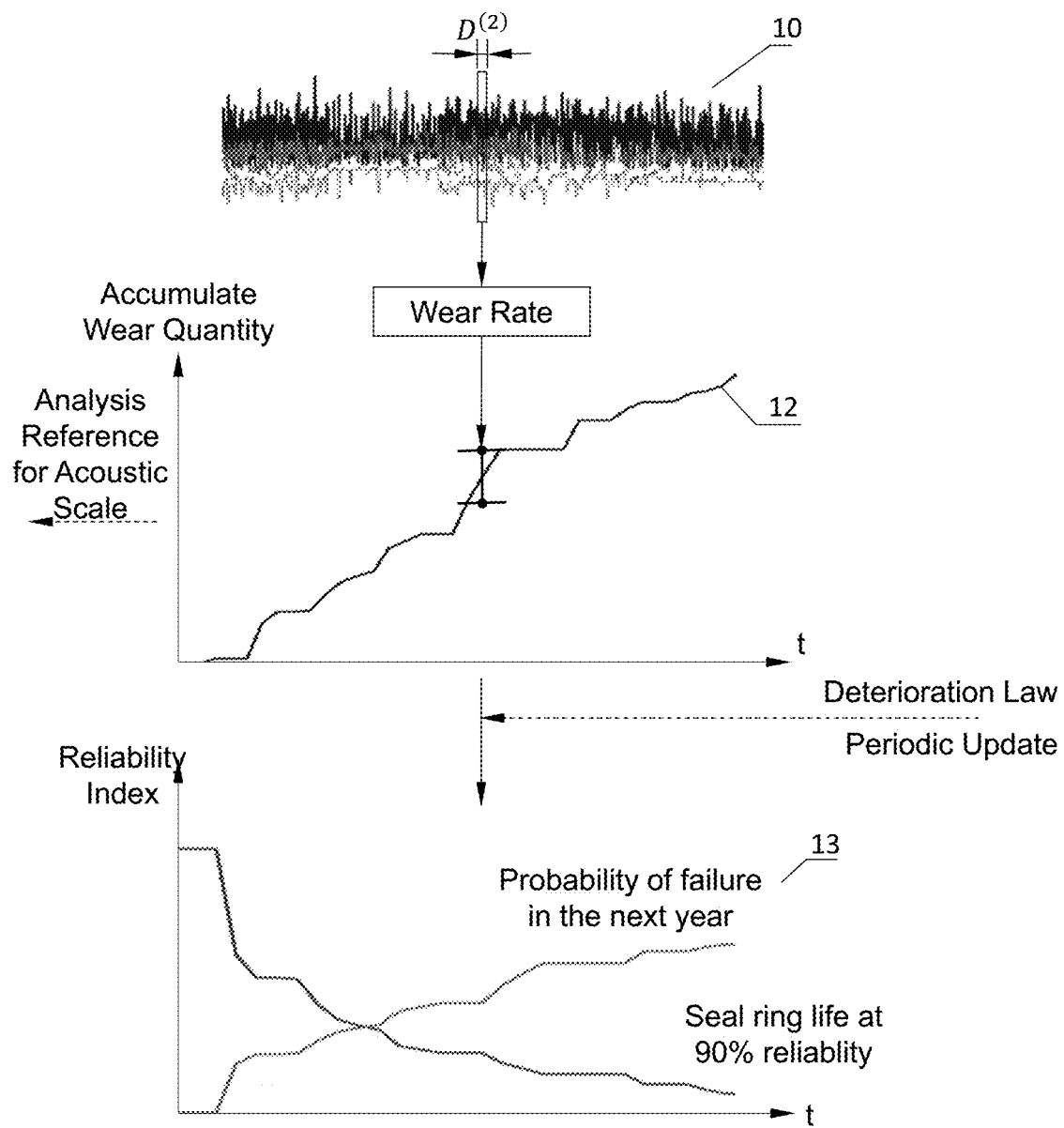
FIG. 5 is a schematic diagram of the service scale.

The Service Scale:

See FIG. 5. According to this embodiment, the service scale analysis revolves around the change in reliability during the wear process of the seal ring. See FIG. 3:

(1) Since the dynamic analysis can obtain the wear rate $U^{(2)}$, then the amount of wear during sealing operation can be calculated: for a stable working process, select a dynamic scale analysis segment with a duration of $D^{(2)}$ at each time interval, and the time difference between the midpoints of adjacent dynamic scale analysis segments is $T^{(2)}$. The wear rate obtained by the analysis segment represents the wear rate in the time interval of $T^{(2)}$ with the midpoint of the analysis section as the midpoint; for the variable speed working process, directly calculate the amount of wear in the process. For each seal ring, calculate the cumulative wear 12;

(2) Through the analysis of the reliability test experiment, the correspondence between the cumulative wear of the seal ring and each reliability index (such as the 90% reliability life of the seal ring and the probability of failure in the next 3 months) is established.

By comparing the results of (1) and (2), each reliability index 13 of the seal ring can be obtained. These reliability indicators can be used as a basis for evaluating the risk of continued service of the seal, and how long it is expected to be scrapped if continued service, thus a production plan can be formulated.

At the same time, once the cumulative wear amount is obtained, it will be adopted by the acoustic scale analysis in the next period of time.

What is claimed is:

1. A multi-scale and real-time monitoring and analysis method for a mechanical seal, characterized in that the method comprises:
measuring an acoustic emission signal generated by a tribo-pair of an end face of the mechanical seal; and
processing analysis at multiple scales in combination with auxiliary information according to different physical connotations of characteristics of the acoustic emission signal at different scales, thereby determining a real-time working state and a performance expectation of the mechanical seal,
wherein the analysis method starts from an original acoustic emission signal and is based on original acoustic emission signal(s) and supplemented by auxiliary information and an algorithm calibrated by experimental data,
wherein through processing on three different time scales of acoustic scale, dynamic scale and service scale, a series of information of a working state of the mechanical seal is obtained, and
wherein a targeted analysis method is used at various time scales to derive physical characterization quantities and pass said quantities to scales of longer time while each scale provides results for analyzing the working state of the mechanical seal.

2. The multi-scale and real-time monitoring and analysis method for the mechanical seal according to claim 1, characterized in that an implementation method of the multi-scale and real-time monitoring and analysis method for the mechanical seal comprises:
processing analysis on an Nth-level time scale, which is capable of obtaining a specific result, wherein the specific result contains physical significance and serves as an object of analysis for a time scale of a subsequent higher level called the (N+1)-level; and
analyzing a change of the result at the Nth-level time scale with time on the (N+1)-level time scale to obtain another result of another aspect, wherein the another result contains physical significance and serves as an object of analysis for a time scale of a (N+2)-level.

3. The multi-scale and real-time monitoring and analysis method for a mechanical seal according to claim 2, characterized in that an implementation method of the multi-scale and real-time monitoring and analysis method for the mechanical seal further comprises:
processing analysis on the (N+1)-level time scale, which is capable of obtaining a specific result, wherein the specific result contains physical significance and serves as an object of analysis for the (N+2)-level time scale; and
analyzing a change of the result at the (N+1)-level time scale with time on the (N+2)-level time scale to obtain an additional result of an additional aspect, wherein said additional result contains physical significance.

4. The multi-scale and real-time monitoring and analysis method for a mechanical seal according to claim 2, wherein at least one result of a longer time scale is fed back to a shorter time scale.

5. The multi-scale and real-time monitoring and analysis method for the mechanical seal according to claim 2, characterized in that:
a specific sound source generates signals in a certain number of frequency bands, and a scale for collecting and identifying these signals is called the acoustic scale;
a movement of the mechanical seal during operation of said mechanical seal due to dynamics causes the acoustic emission signal to change accordingly, this feature being reflected on a time scale equivalent to a rotation period and wherein this scale is called the dynamic scale;
during a long-term service of the mechanical seal, performance of said mechanical seal changes cumulatively due to at least one deterioration factor, this feature including an investigation of long-term change history of the acoustic emission signal and this scale is called the service scale.

6. The multi-scale and real-time monitoring and analysis method for a mechanical seal according to claim 5, characterized in that:
the method of determining the real-time working state and giving the performance expectation of the mechanical seal via processing analysis at the acoustic scale in combination with the auxiliary information comprises the steps of:
analyzing the acoustic scale from a short period of the acoustic emission signal combined with the auxiliary information to obtain a series of characteristic quantities corresponding to various states of the tribo-pair, including reprocessing by filtering the frequency spectrum of the acoustic emission signal and introducing auxiliary information modification; and then
transforming the preprocessed frequency spectrum into a series of physical representations via a preset mapping function established according to the correspondence between the frequency band of the frequency spectrum and the physical process represented,
wherein these characterizations have the function of showing the working state of the mechanical seal to a user, and also form a basis of the dynamic scale analysis.

7. The multi-scale and real-time monitoring and analysis method for the mechanical seal according to claim 5, characterized in that:
a method of determining the real-time working state and giving the performance expectation of the mechanical seal via processing analysis at the dynamic scale in combination with auxiliary information comprises the steps of:
utilizing the principles that periodic excitation to a mechanical seal system comprising the mechanical seal is generated during rotation of a mechanical seal moving ring with a shaft, and a periodic dynamic response of the mechanical seal system is dependent on the severity of friction and/or circumferential non-uniformity of the mechanical seal system;
obtaining a relationship between a dynamic change mode of the acoustic characterization quantity and the working state of the mechanical seal in advance through experimental testing or computer simulation; and
processing a prediction on the basis of the acoustic scale analysis of the measured equipment of the mechanical seal system.

8. The multi-scale and real-time monitoring and analysis method for the mechanical seal according to claim 5, characterized in that:
a method of determining the real-time working state and giving the performance expectation of the mechanical seal via processing analysis at the service scale in combination with auxiliary information comprises the steps of:
determining that during the operation of the mechanical seal, a seal ring of a mechanical seal system comprising the mechanical seal will inevitably wear, and springs and secondary seals of said mechanical seal system degrade performance during long-term use;
obtaining a wear rate based on a basis that a severity of friction of the mechanical seal system is obtained through analysis of the dynamic scale; and
predicting future performance changes and failures risk of the mechanical seal system by using an in advance established relationship between a cumulative wear rate and a progress of mechanical seal deterioration, and by using a degradation progress of the mechanical seal system as a reference for the analysis of the acoustic scale and the dynamic scale.

9. The multi-scale and real-time monitoring and analysis method for a mechanical seal according to claim 5, wherein the at least one deterioration factor is selected from the group consisting of running-in, wear, and aging of elastic elements.

* * * * *